(12) United States Patent
Buchanan et al.

(10) Patent No.: US 6,392,007 B1
(45) Date of Patent: May 21, 2002

(54) MULTI-PIXEL LIQUID STREAMS, ESPECIALLY FIBER-FORMING POLYMERIC STREAMS, AND METHODS AND APPARATUS FOR FORMING SAME

(75) Inventors: Karl H. Buchanan; Wendel L. Burton, both of Arden, NC (US); Charles F. Helms, Jr., Greenwood, SC (US); John A. Hodan, Arden; Gary W. Shore, Asheville, both of NC (US)

(73) Assignee: BASF Corporation, Mount Olive, NJ (US)

( * ) Notice: Subject to any disclaimer, the term of this patent is extended or adjusted under 35 U.S.C. 154(b) by 0 days.

(21) Appl. No.: 09/475,231

(22) Filed: Dec. 30, 1999

(51) Int. Cl.⁷ .......................... C08G 69/28; D01D 4/06; B01J 8/04
(52) U.S. Cl. .................. 528/310; 528/322; 528/480; 528/502 R; 425/131.5; 425/192 S; 425/199; 422/135; 422/191; 422/229; 422/378.2; 422/382.2; 366/340; 264/171.1; 264/172.11; 264/172.13; 264/172.15; 264/172.17
(58) Field of Search ................... 528/310, 322, 528/502 R, 480; 264/171.1, 172.15, 172.11, 172.13, 172.17; 422/135, 191, 229, 382.2, 378.2; 366/340; 425/131.5, 192 S, 199

(56) References Cited

U.S. PATENT DOCUMENTS

| | | |
|---|---|---|
| 3,316,064 A | 4/1967 | Kuzuoka et al. ............ 422/134 |
| 3,476,521 A | 11/1969 | Wise .......................... 422/138 |
| 3,480,596 A | 11/1969 | Simons ................. 264/331.19 |
| 3,753,661 A | 8/1973 | Simons ...................... 422/135 |
| 4,052,146 A | * 10/1977 | Sternberg ................ 425/131.5 |
| 4,734,263 A | 3/1988 | Gerking et al. ............. 422/135 |
| 4,755,590 A | 7/1988 | Kubánek et al. ............ 528/503 |
| 4,765,780 A | * 8/1988 | Angstadt .................... 406/123 |
| 4,778,659 A | 10/1988 | Inoue ......................... 422/135 |
| 4,847,051 A | 7/1989 | Parenti, Jr. .................. 422/202 |
| 5,137,369 A | 8/1992 | Hodan ........................ 366/340 |
| 5,264,282 A | 11/1993 | Enggasser et al. .......... 428/304 |
| 5,534,328 A | 7/1996 | Ashmead et al. ........... 428/166 |
| 5,538,700 A | 7/1996 | Koves ........................ 422/200 |
| 5,834,089 A | 11/1998 | Jones et al. .................. 428/97 |
| 5,843,385 A | 12/1998 | Dugan ........................ 422/191 |
| 5,851,562 A | 12/1998 | Haggard et al. ......... 424/131.5 |

* cited by examiner

Primary Examiner—P. Hampton-Hightower
(74) Attorney, Agent, or Firm—Nixon & Vanderhye P.C.

(57) ABSTRACT

At least two different liquid streams are sub-divided into a dense plurality of individually separated parallel pixels oriented in respective misregistered arrays. Therefore, an individual pixel of one of the liquid stream arrays will be surrounded by pixels of the other liquid stream array. These individual pixel arrays are then bought into contact with one another to form a multi-pixel liquid stream comprised of the misregistered pixel arrays of the two different liquid streams. The "pixelated" liquid stream—that is, the liquid stream containing in cross-section the misregistered pixel arrays of the two different liquid streams—may then be further processed. For example, the pixelated liquid stream may be subjected to further mixing by being directed along a tortuous flow path.

27 Claims, 10 Drawing Sheets

MULTI-PIXEL LIQUID STREAMS, ESPECIALLY FIBER-FORMING POLYMERIC STREAMS, AND METHODS AND APPARATUS FOR FORMING SAME

FIELD OF THE INVENTION

The present invention relates generally to the processing of liquid streams. In preferred forms, the present invention relates to flowable polymeric streams, especially fiber-forming polymeric streams, formed of multiple pixels having different physical, visual and/or constituent properties, and to the methods and apparatus for forming the same.

BACKGROUND AND SUMMARY OF THE INVENTION

It is oftentimes desirable to bring at least two liquid streams into intimate contact with one another. For example, in the processing of polymeric materials, especially melts of thermoplastic materials, it may be desirable to incorporate additives such as colorants, stabilizers, delusterants, flame retardants, fillers, antimicrobial agents, antistatic agents, optical brighteners, extenders, processing aids and other functional additives into polymeric host materials so as to engineer desired properties of the resulting blend. (See, for example, U.S. Pat. No. 5,834,089, the entire content of which is incorporated expressly hereinto by reference.)

It may also be desirable to bring at least two liquid reactant streams into intimate contact with each other so as to effect chemical reaction. For example, it may be desirable to continuously bring a polymerizable material into intimate contact with a catalyst and/or initiator so as to produce a polymeric material in a continuous manner. While relatively large-scale reactors are known for such purposes, it has more recently been suggested that relatively smaller scale plate reactors may be beneficial in some instances. (See in this regard, U.S. Pat. Nos. 5,534,328 and 5,843,385, the entire content of each being expressly incorporated hereinto by reference.)

In order to assist in the mixing of liquid streams, especially streams of polymeric materials or streams of chemical reactants, it has been proposed to use a series of stacked plates which define tortuous paths along which the mixture travels between the mixer inlet and outlet. (See in this regard, U.S. Pat. Nos. 5,137,369 and 5,851,562, the entire content of each being incorporated hereinto by reference). These static continuous mixers essentially require that at least two liquid streams be brought initially into contact with each other, with such an initial combination of liquid streams thereafter being subjected to a tortuous flow path to achieve the desired mixing.

While these conventional static continuous mixers are satisfactory for their intended purposes, some improvements are still desired in order to achieve truly homogeneous and/or substantially instantaneous blending of at least two different liquid streams. It is towards fulfilling such desires that the present invention is directed.

Broadly, the present invention contemplates that at least two different liquid streams are sub-divided into a dense plurality of individually separated parallel pixel substreams oriented in respective misregistered arrays. Therefore, an individual pixel of one of the liquid stream arrays will be surrounded by pixels of the other liquid stream array. These individual pixel arrays are then bought into contact with one another to form a multi-pixel liquid stream comprised of the misregistered pixel arrays of the two different liquid streams. The "pixelated" liquid stream—that is, the liquid stream containing in cross-section the misregistered pixel arrays of the two different liquid streams—may then be further processed. For example, the pixelated liquid stream may be subjected to further mixing by being directed along a tortuous flow path.

Since the pixelated liquid stream will exhibit, in cross-section, a dense plurality of individual mutually adjacent pixels formed of the two different liquid streams, there exists greater likelihood that a more homogenous and/or instantaneous blend will be achieved following further static mixing. However, even if a true homogenous blend is not achieved, the dense plurality of misregistered pixels will be visually perceived as being "blended". Such an attribute is important if the two liquid streams which are pixelated are differently colored and/or immiscible. Thus, the dense plurality of misregistered pixels of different colored liquids will exhibit a visually perceived color tone that is a combination of the coloration of each liquid stream, even though a true homogenous blend may not be achieved. Therefore, any further mixing of the pixels will only serve to enhance the visual appearance of the resulting combined liquid stream.

In particularly preferred forms of the invention, therefore, a series of plates is provided which fractionate the liquid streams into a geometric X-shaped patterns to form a dense plurality of $4^{(n-1)}$ number of pixels, where n is the number of plates employed. The "fractal geometry" of the X-design ensures that the channel path length, in the direction of liquid flow, is equivalent for any two pixel domains. This equivalence of channel length ensures uniform residence times, pressure drop and flow rates for any two pixel domains, which is especially critical for processing chemical reactant streams.

The present invention and the fractal geometry employed thereby increases the total interfacial area available at onset of mixing, but subdividing liquid streams into a dens plurality of substreams (pixels). When using X-shaped subdividing geometries, and assuming a constant, cumulative cross-sectional area of all pixel-forming apertures (and thereby constant flow velocities), the increased available surface area for each liquid flow will increase by a factor of $2^n$, wherein n is again the number of plates employed. Depending on the application, it might be desirable to decrease the velocity profile or increase the velocity profile by progressively increasing the total cross-sectional area of the apertures of decreasing the total cross-sectional area of the apertures, respectively. The resulting increase in the available surface area for each of the liquid streams by virtue of the dense plurality of misregistered pixels will thereby ensure substantially instantaneous mixing of two liquid streams once the individual respective pixels thereof come into contact with one another.

These and other aspects and advantages will become more clear after careful consideration is given to the following detailed description of the preferred exemplary embodiments which follows.

BRIEF DESCRIPTION OF THE ACCOMPANYING DRAWINGS

Reference will hereinafter be made to the accompanying drawings, wherein like reference numerals throughout the various FIGURES denote like structural elements, and wherein, FIG. 1 is a perspective assembly view which depicts an exemplary device of this invention to achieve a pixelated liquid stream;

FIGS. 3B-1 through 3H-1 are schematic plan view of the aperture and flow channel arrays provided on the plates depicted in FIGS. 3B through 3I, respectively;

DETAILED DESCRIPTION OF THE INVENTION

Figure 1:
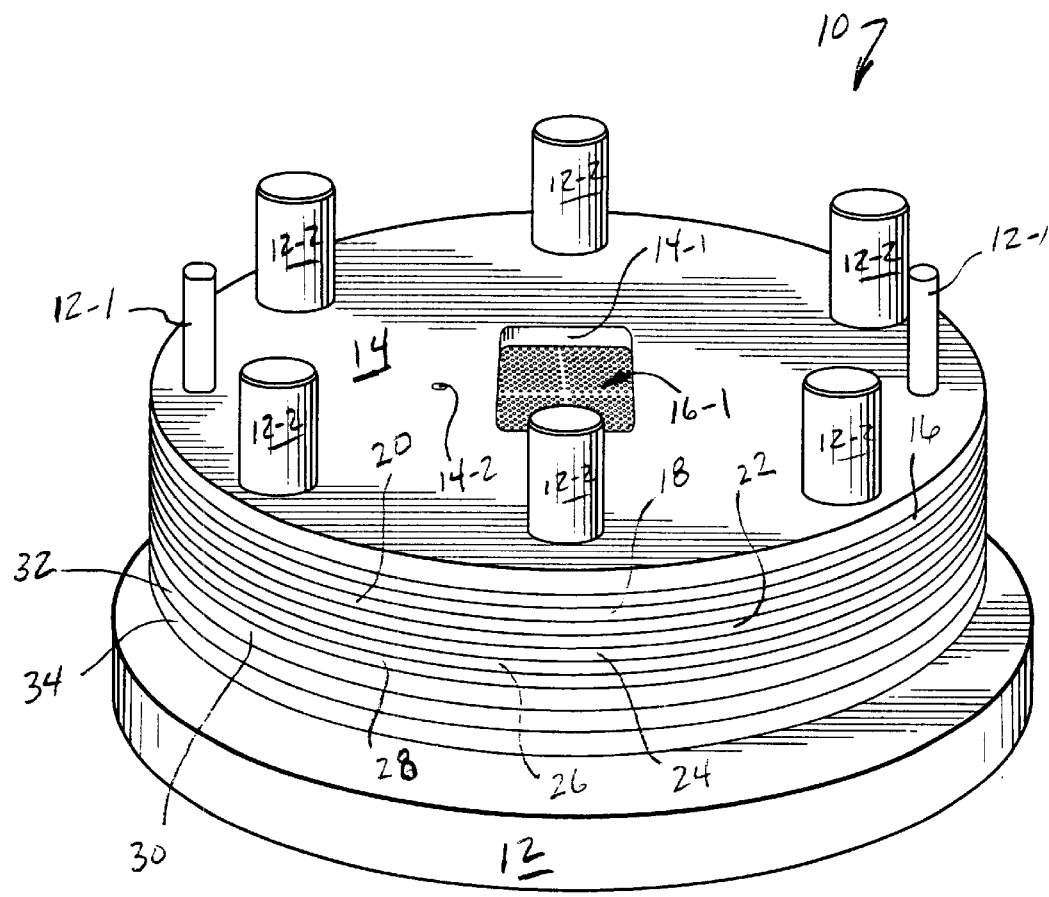
Figure 2:
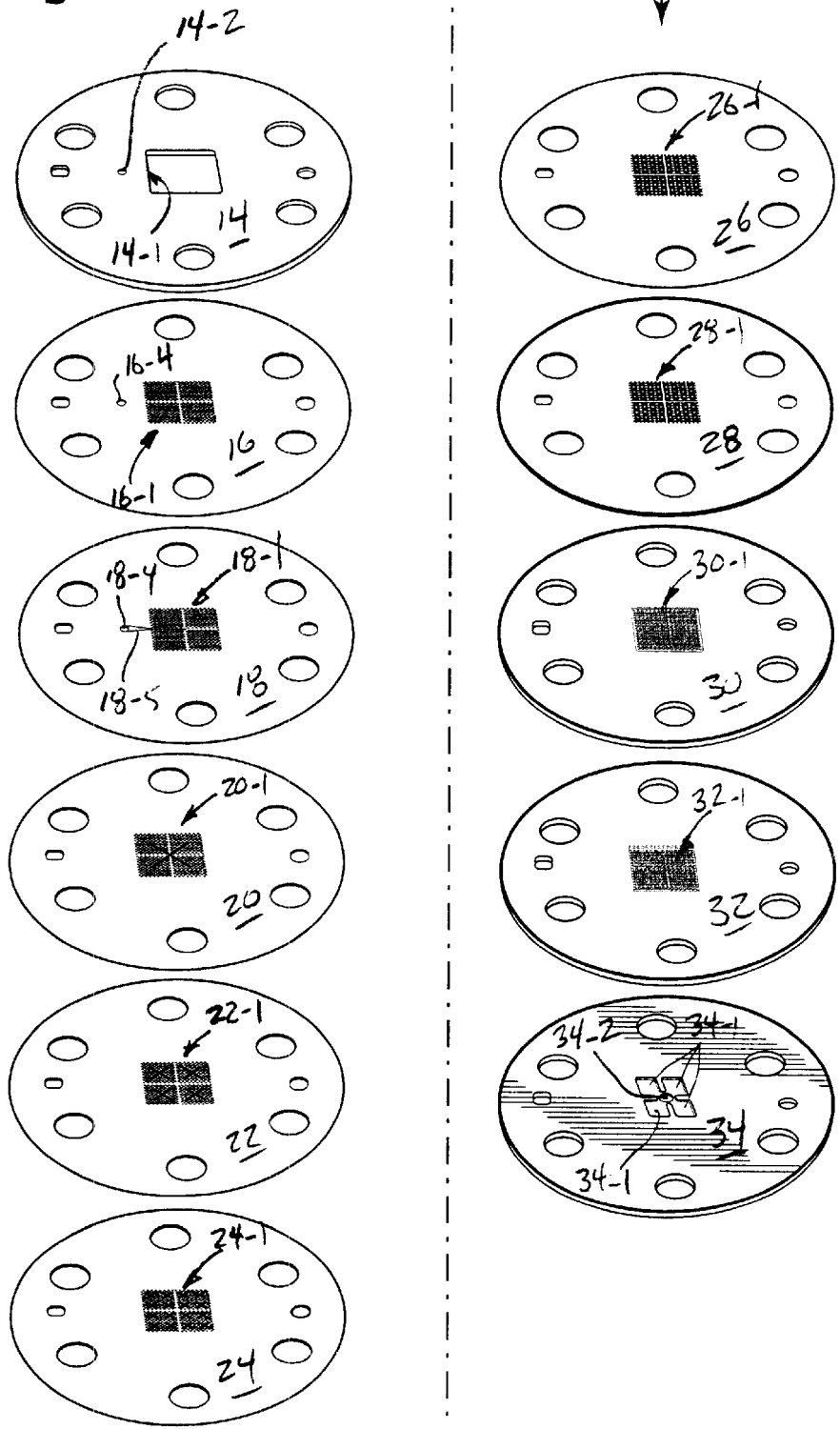
FIG. 2 is an exploded perspective view of the individual plates that are included in the device of FIG. 1.

A "pixel" as used herein and in the accompanying claims means a continuous liquid domain which is a substream of a corresponding liquid flow stream. Thus, the term "pixelated" when referring to a liquid flow stream means that the liquid flow stream is formed of a dense plurality of pixels formed of at least two different liquids and arranged in a geometric (preferably square) matrix array such that the array of pixels of one liquid is misregistered with respect to the pixels of the other liquid. Although the following drawings depict situations wherein essentially a 50/50 mix of pixels formed of each respective liquid is present, it is contemplated that the pixels formed of one of the liquids may be present in greater or lesser amount as compared to the pixels formed of the other liquid, in which case the lesser number of pixels may be distributed symmetrically or asymmetrically throughout the square matrix of the greater number of pixels.

Most preferably, the present invention is employed for the purpose of forming pixelated liquid polymer streams that are fiber-forming. As used herein and in the accompanying claims, the term "fiber-forming" is meant to refer to polymers which are capable of being formed into a fiber structure having a length at least 100 times its width. The term "fiber" includes fibers of extreme or indefinite length (filaments) and fibers of short length (staple). The term "yarn" refers to a continuous strand or bundle of fibers.

Virtually any fiber-forming polymer may usefully be employed in the practice of this invention. In this regard, suitable classes of polymeric materials that may be employed in the practice of this invention include polyamides, polyesters, acrylics, olefins, maleic anhydride grafted olefins, and acrylonitriles. More specifically, nylon, low density polyethylene, high density polyethylene, linear low density polyethylene and polyethylene terephthalate may be employed.

The respective pixels forming the multi-pixel fibers of this invention may be formed from different polymeric materials having different physical properties. Alternatively, each respective pixel in the fiber may be formed from the same polymeric materials, provided that the polymeric materials of the respective pixel domains exhibit different physical, visual and/or constituent properties Thus, for example, the respective pixel domains may be formed of the same base polymeric material (e.g., nylon) but exhibit at least one of different viscosities, different colorations, different additives (e.g., either additive types or concentrations, if the same additive) and the like.

The preferred polymers used in forming the pixelated fibers of this invention are polyamides. In this regard, those preferred polyamides are generically known by the term "nylon" and are long chain synthetic polymers containing amide (—CO—NH—) linkages along the main polymer chain. Suitable melt spinnable, fiber-forming include those which are obtained by the polymerization of a lactam or an amino acid, or those polymers formed by the condensation of a diamine and a dicarboxylic acid. Typical polyamides useful in the present invention include nylon 6, nylon 6/6, nylon 6/9, nylon 6/10, nylon 6T, nylon 6/12, nylon 11, nylon 12, nylon 4,6 and copolymers thereof or mixtures thereof. Polyamides can also be copolymers of nylon 6 or nylon 6/6 and a nylon salt obtained by reacting a dicarboxylic acid component such as terephthalic acid, isophthalic acid, adipic acid or sebacic acid with a diamine such as hexamethylene diamine, methaxylene diamine, or 1,4-bisaminomethylcyclohexane. Preferred are poly-$\epsilon$-caprolactam (nylon 6) and polyhexamethylene adipamide (nylon 6/6). Most preferred is nylon 6. The preferred polyamides will exhibit a relative viscosity of between about 2.0 to about 4.5, preferably between about 2.4 to about 4.0. The polyamide may also be the anionic polymerization reaction product of lactams (see U.S. Pat. No. 3,342,784, the entire content of which is expressly incorporated hereinto by reference).

Accompanying FIG. 1 depicts one preferred exemplary embodiment of a device 10 in accordance with the present invention. As shown, the device 10 includes a support plate 12 which serves to structurally support a stack of relatively thinner plates 16 through 34, the purpose of which will be explained in greater detail below. A pair of upright guide posts 12-1 is carried by the support plate 12 and serve to orient the plates 16 through 34 during assembly. The individual plates 16 through 34 are compressively maintained as a unit on the support plate 12 by means of bolts 12-2.

The individual plates 16 through 34 are shown more clearly in accompanying FIGS. 2 and 3A–3K. In this regard, it will be noted that the uppermost (relative to the liquid flow direction) plate 14 has a relatively large rectangular inlet opening 14-1 centrally disposed on the plate 14, and a relatively smaller circular inlet opening 14-2 laterally of the central inlet opening 14-1. The inlet openings 14-1 and 14-2 are provided to accept two different liquid streams by suitable liquid supply connections (not shown) from respective sources thereof.

The first liquid stream therefore flows through the inlet opening 14-1 and is introduced to aperture array 16-1 formed in plate 16. As shown, the first liquid stream is thus formed into a number of individual pixels by means of the individual apertures (a representative few apertures being identified in FIGS. 3B and 3B-1 by reference numeral 16-2) forming the array 16-1. The apertures 16-2 are most preferably formed in a square matrix whereby the apertures 16-2 of one row are laterally off-set relative to the apertures 16-2 in adjacent rows. As such, diagonal regions 16-3 (see FIG. 3B-1) of the plate 16 are established between diagonally oriented rows of the apertures 16-2, the purpose of which will become more clear from the discussion below.

In the discussion which follows, only representative structural elements are identified in the drawing FIGS. 3C–3K and 3C-1 through 3H-1 in the interest of maintaining visual clarity.

The plate 18 (see FIGS. 3C and 3C-1) is provided with a similar array 18-1 of apertures 18-2 defining diagonal regions 18-3 therebetween. Each of the apertures 18-2 is thus coaxially aligned with a respective one of the apertures 16-2 of plate 16 so that the pixels of the first liquid stream pass therethrough.

The other liquid stream meanwhile passes through the inlet 14-2 of plate 14, and the coaxially aligned aperture 16-4 of plate 16 so it is delivered to aperture 18-4 of plate 18 and its associated laterally projecting feed channel 18-5. As is perhaps more clearly shown in FIG. 3C-1, the feed channel 18-5 terminates at a central aperture 18-6. The aperture 18-4 is, of course, blind since it is blocked at its lower extent by the surface of plate 20, while the aperture 18-6 communicates with the central aperture 20-6 formed in plate 20.

A series (e.g., four) of radiating supply channels 20-7 extend outwardly from, and communicate with, the central aperture 20-6. Each of the supply channels 20-7 terminates in a terminal aperture 20-8 as shown more clearly in FIG. 3D-1. As with plate 18 discussed above, plate 20 is provided with an array 20-1 of apertures 20-2 defining diagonal regions 20-3 therebetween. Each of the apertures 20-2 is thus coaxially aligned with a respective one of the apertures 18-2 of plate 18 so that the pixels of the first liquid stream pass therethrough.

The central aperture 20-6 is blind since it is blocked by the plate 22 located therebelow. The terminal apertures 20-8, however, communicate with a respective one of the central apertures 22-6 formed in plate 22 (see FIG. 3E-1).

The central apertures 22-6 communicate with a respective series (e.g., four) of supply channels 22-7. Each of the supply channels 22-7 terminates in a terminal aperture 22-8 as shown more clearly in FIG. 3E-1. As with plate 20 discussed above, plate 22 is provided with an array 22-1 of apertures 22-2 defining diagonal regions 22-3 therebetween. Each of the apertures 22-2 is thus coaxially aligned with a respective one of the apertures 20-2 of plate 20 so that the pixels of the first liquid stream pass therethrough.

Each of the central apertures 22-6 is blind since it is blocked by the plate 24 located therebelow. The terminal apertures 22-8, however, communicate with a respective one of the central apertures 24-6 formed in plate 24 (see FIG. 3F-1).

The central apertures 24-6 communicate with a series (e.g., four) of respective supply channels 24-7. Each of the supply channels 24-7 terminates in a terminal aperture 24-8 as shown more clearly in FIG. 3F-1. As with plate 22 discussed above, plate 24 is provided with an array 24-1 of apertures 24-2 defining diagonal regions 24-3 therebetween. Each of the apertures 24-2 is thus coaxially aligned with a respective one of the apertures 22-2 of plate 22 so that the pixels of the first liquid stream pass therethrough.

Each of the central apertures 24-6 is blind since it is blocked by the plate 26 located therebelow. The terminal apertures 24-8, however, communicate with a respective one of the flow channels 26-6 formed in plate 26 (see FIG. 3G-1).

The flow channels 26-6 communicate with a series (e.g., four) of respective supply channels 26-7. Each of the supply channels 26-7 terminates in a terminal aperture 26-8 as shown more clearly in FIG. 3G-1. As with plate 24 discussed above, plate 26 is provided with an array 26-1 of apertures 26-2 defining diagonal regions 26-3 therebetween. Each of the apertures 26-2 is thus coaxially aligned with a respective one of the apertures 24-2 of plate 24 so that the pixels of the first liquid stream pass therethrough.

Figure 3A:
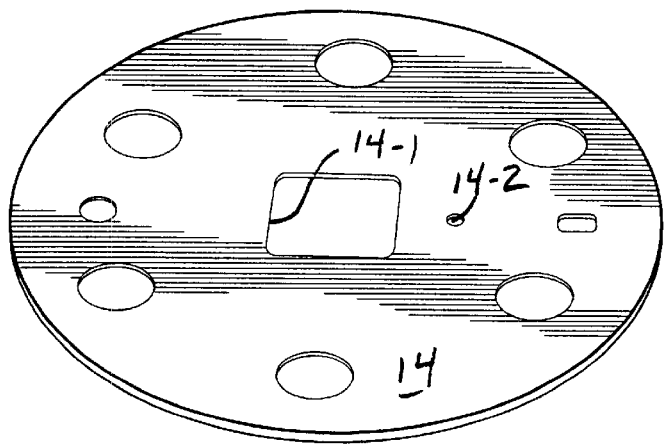
FIGS. 3A through 3K are enlarged perspective views of the individual plates depicted in FIG. 2.
Figure 3B:
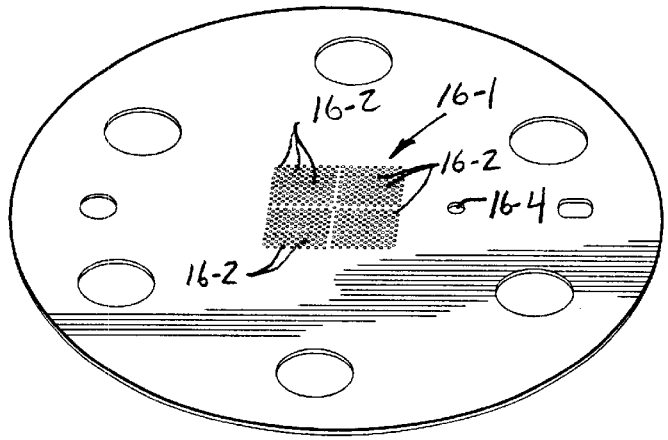
Figures 1, 3B:
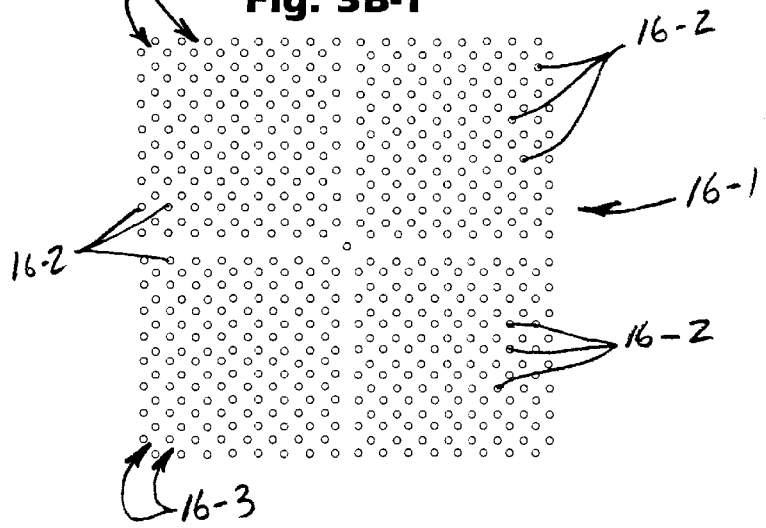
Figure 3C:
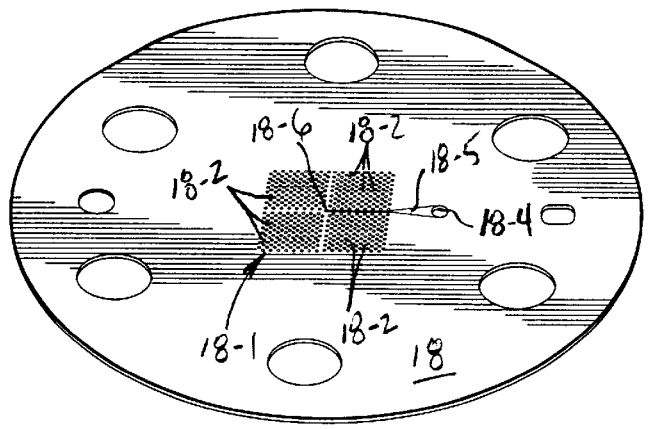
Figure 3D:
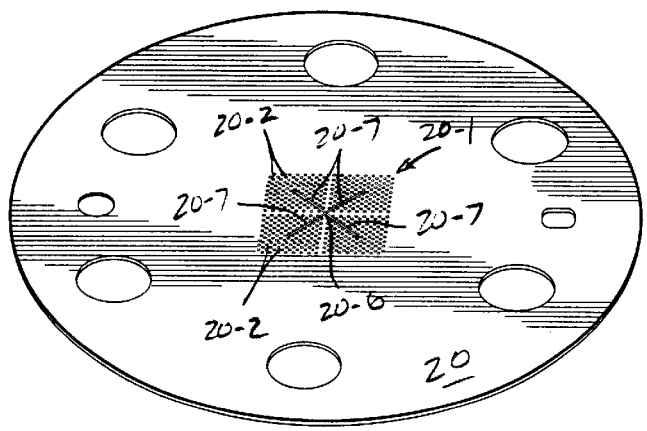
Figure 3D:
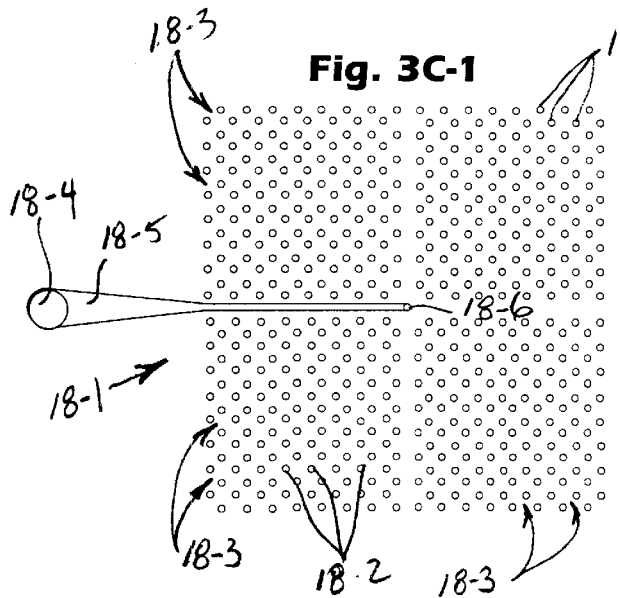
Figure 3D:
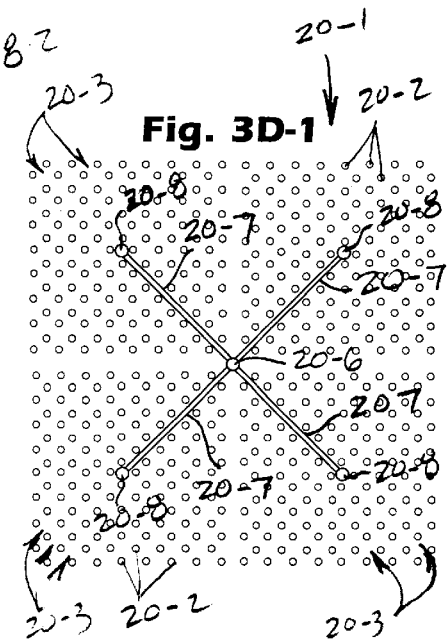
Figure 3E:
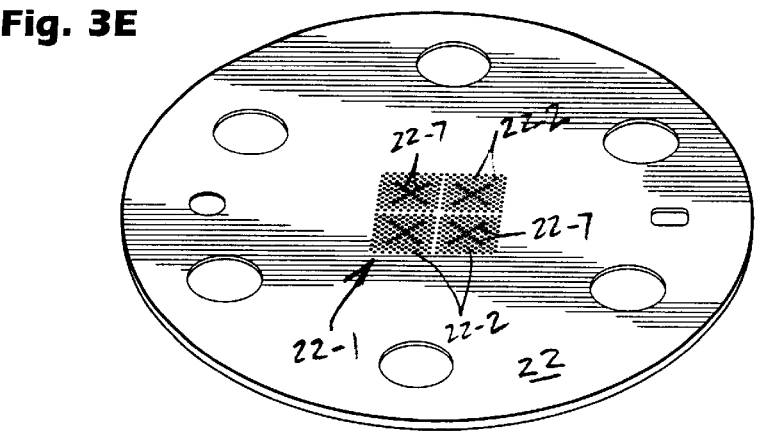
Figure 3F:
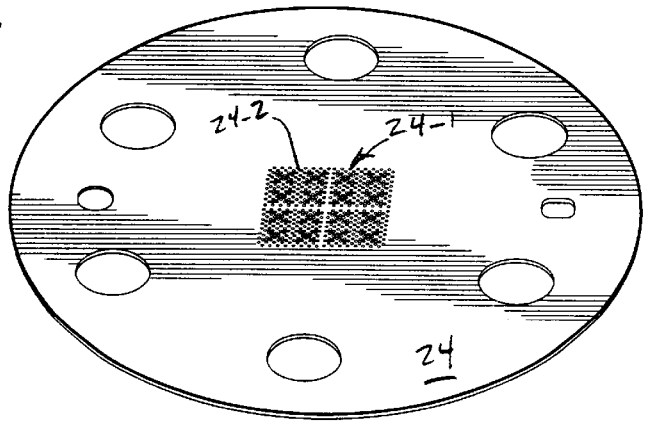
Figures 1, 3E:
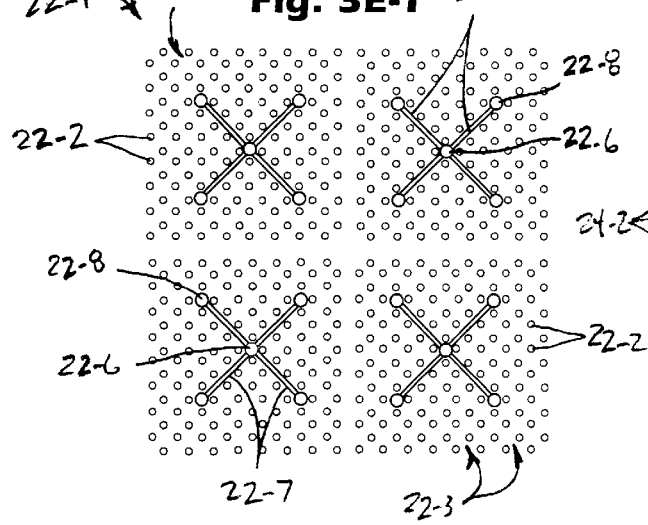
Figures 1, 3F:
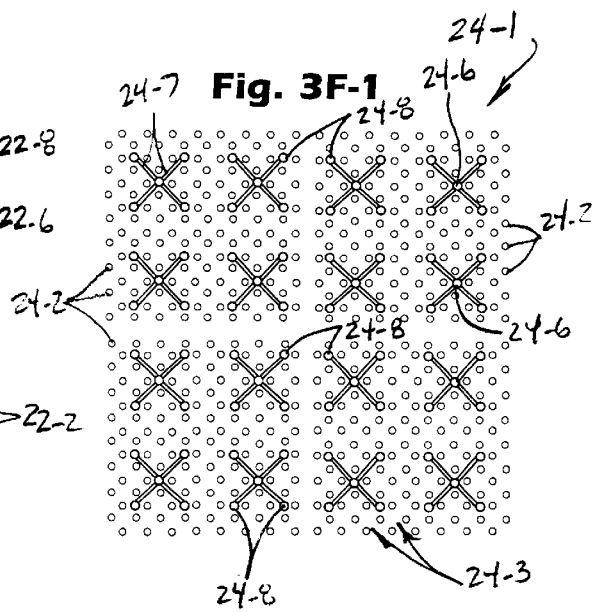
Figure 3G:
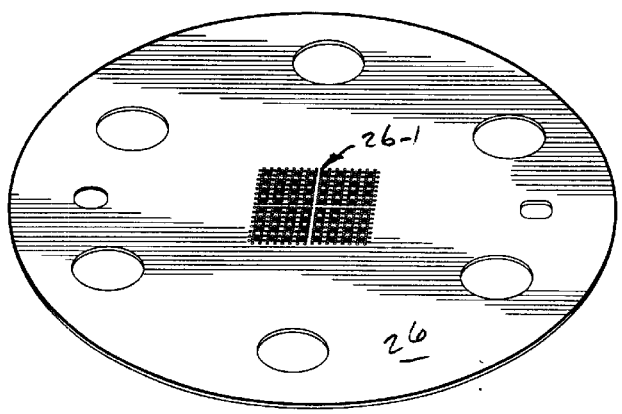
Figure 3H:
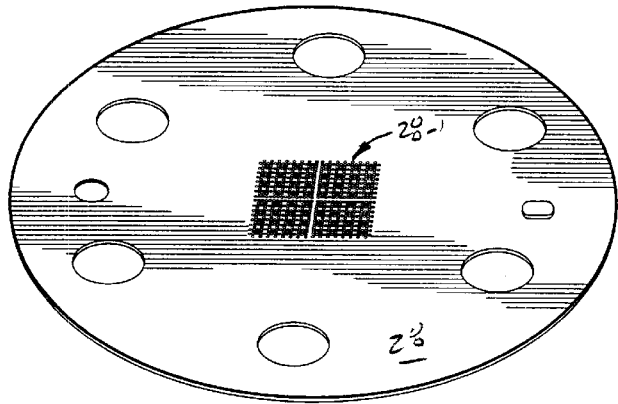
Figure 3H:
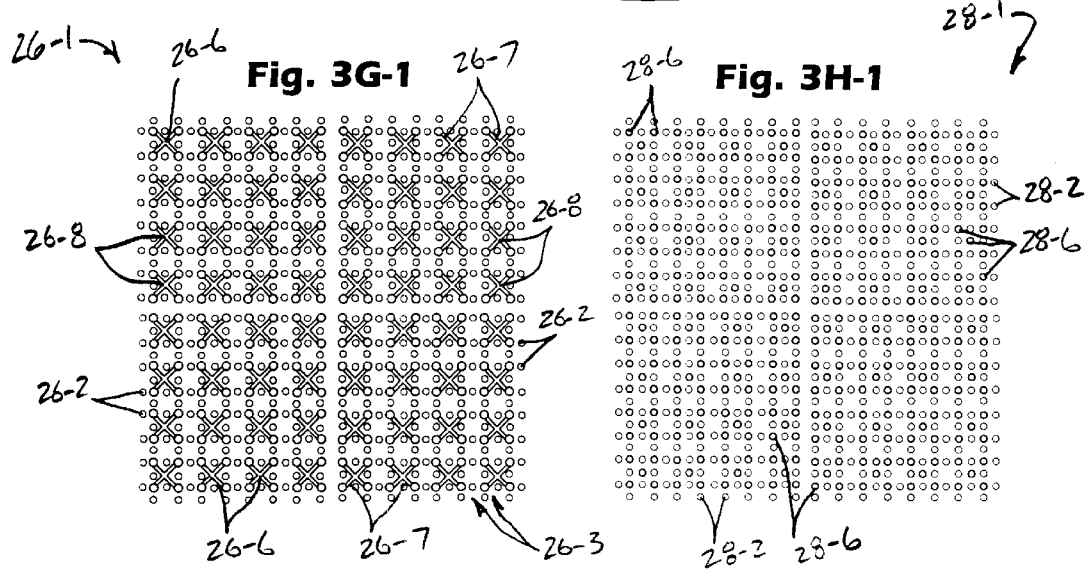
Figure 3I:
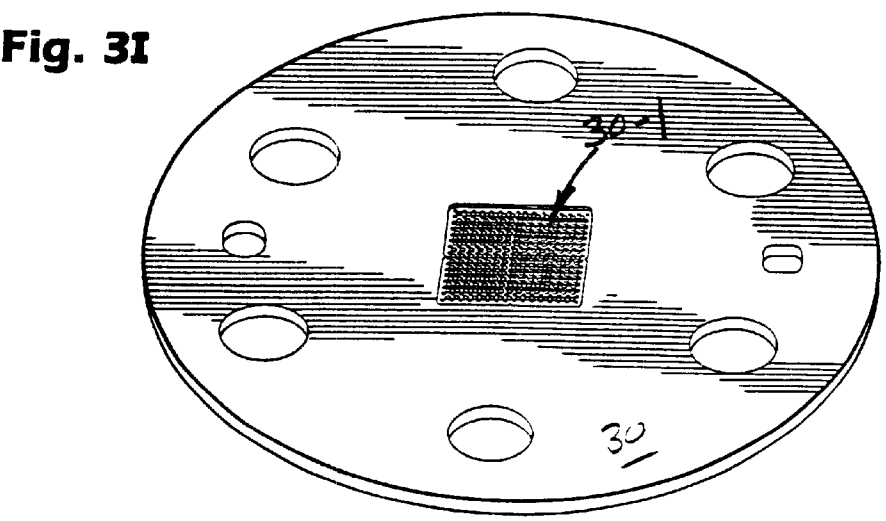
Figure 3J:
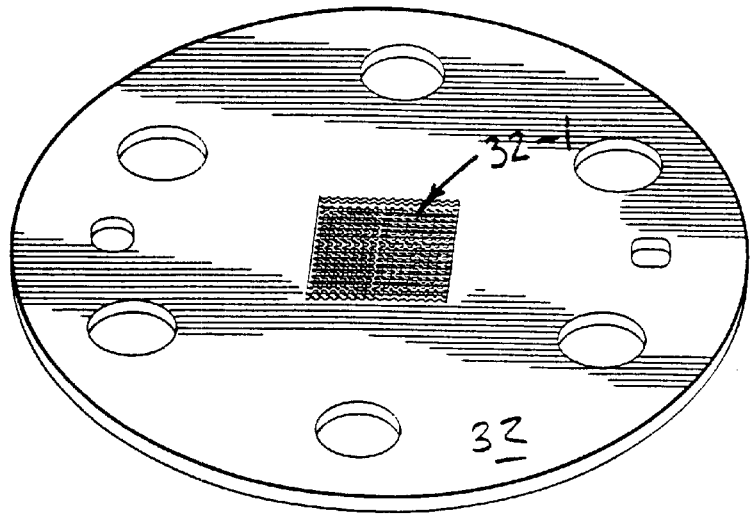
Figure 3K:
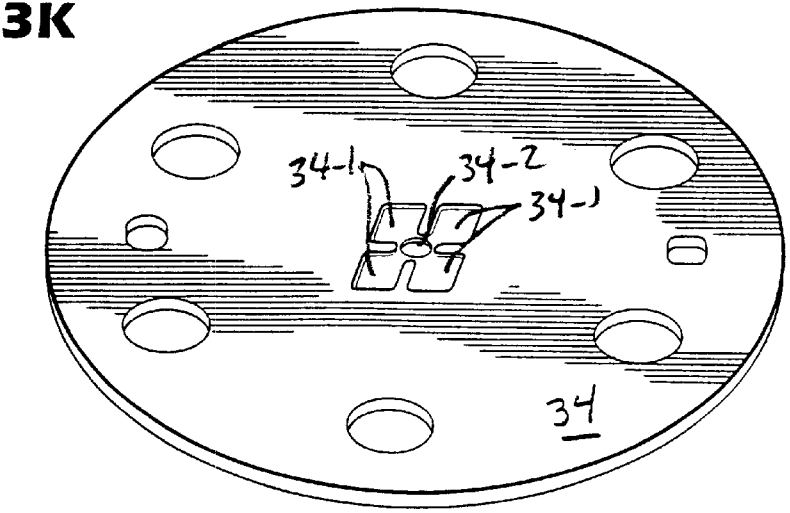
Figure 4A:
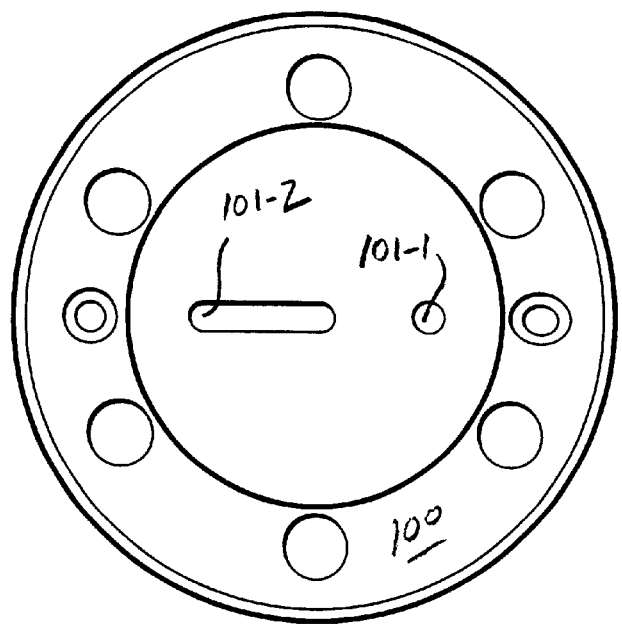
FIGS. 4A through 4E depict other plate configurations according to another embodiment of this invention.
Figure 4B:
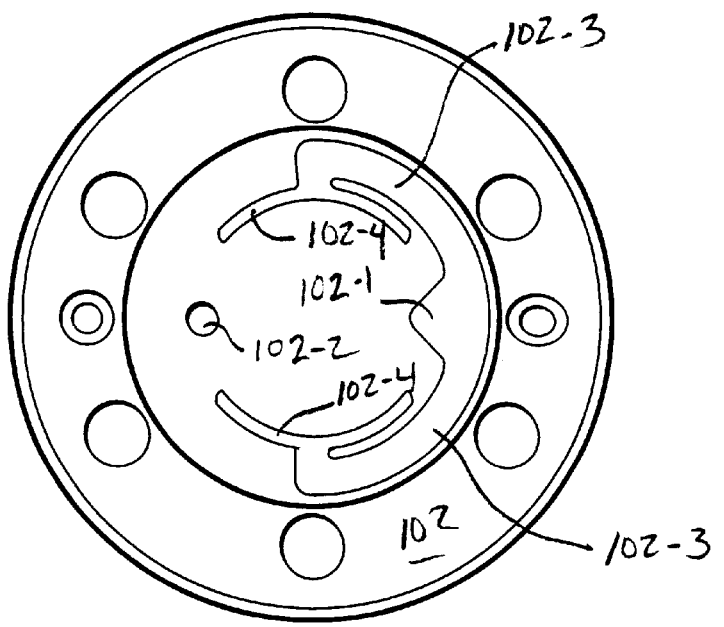
Figure 4C:
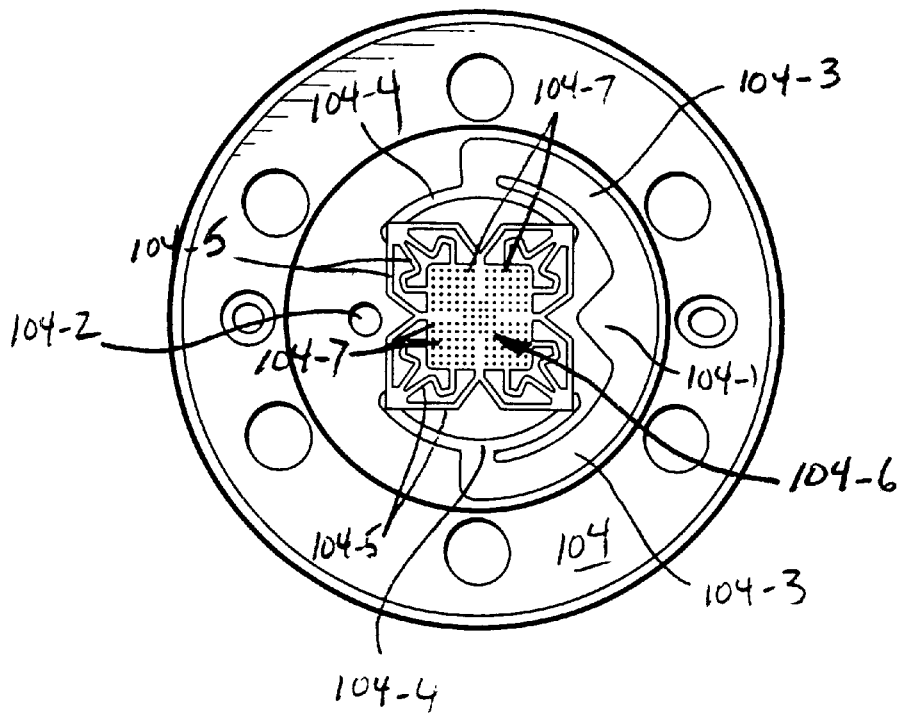
Figure 4D:
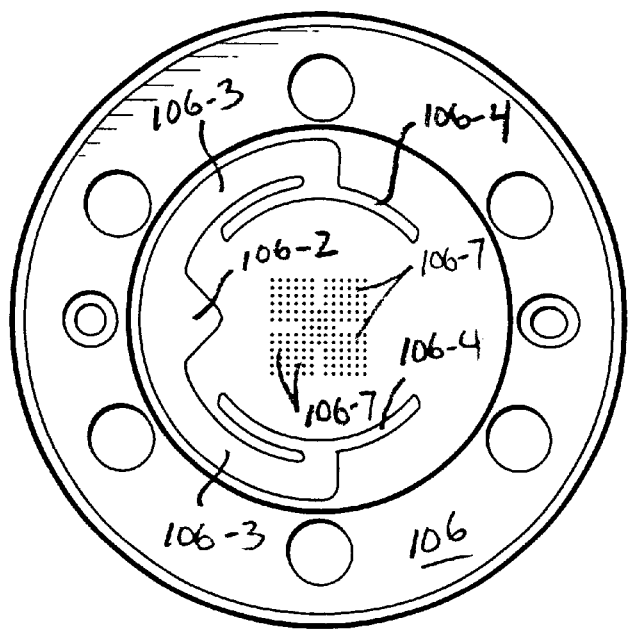
Figure 4E:
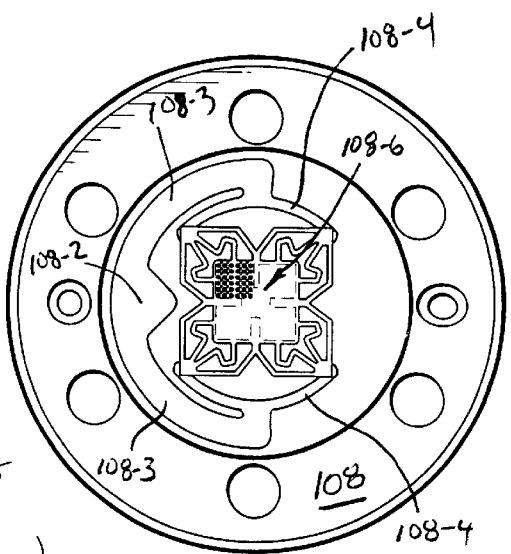

The terminal apertures 26-8 communicate with a respective one of the apertures 28-6 formed in plate 28 (see FIG. 3H-1). In this regard, it will be observed that, upon reaching apertures 28-6, the second liquid will be formed into respective pixels defined thereby. Moreover, these pixels of the second liquid are disposed in a symmetrical square array which is misregistered with the square array of pixels formed of the first liquid (i.e., as defined by the individual apertures 28-2). As such, an alternating pattern of pixels formed of the first and second liquids is achieved.

Individual pixel domains of the second liquid will thus be centrally disposed relative to, and surrounded by, individual pixel domains of the first liquid. It will be understood that this "division" of the second stream could be perpetuated further so that every row and column included alternating pixels of the first and second liquids. Furthermore, less division of the second liquid could be present as compared to that depicted in the drawing FIGURES.

The individual pixel-forming apertures of the plates will most preferably have a nominal exit diameter of between about 0.1 mm to about 1.0 mm, and preferably between about 0.3 mm to about 0.7 mm. By the term "nominal diameter" is meant the smallest diameter of an imaginary circle which completely surrounds the pixel-forming aperture. Thus, for true circular pixels, the nominal diameter will be the same as the diameter of the pixel-forming aperture. For non-round pixels, however, the nominal diameter will be the smallest diameter of the imaginary circle which completely surrounds the pixel-forming diameter.

The density of the pixels formed from both the first and second liquids is dependent upon the physical constraints imposed by forming the apertures in the plates. However, when employed for purposes of forming a pixelated liquid stream of fiber-forming plastics material, the pixel density is preferably between about 0.1 to about 4.0 pixels per $mm^2$, and more preferably between about 0.2 to about 2.5 pixels per $mm^2$. Pixel densities of up to about 400 pixels per $mm^2$ are possible with laser machining techniques which would increase the interfacial area by a factor of 1024. Such an ultra-fine resolution would be desirable for two streams of low viscosity fluids that are highly reactive.

The interfacial surface area of the main inlet liquid streams is typically increased by a factor of $2^n$, where n is the number of plates using X-shaped fractal geometry to subdivide the liquid streams as described above, assuming the sum total of cross-sectional flow area remains constant. The $2^n$ geometric progression assumes the cross-sectional area of the main (undivided) host streams are equivalent to the summation of the cross-sectional area of the stream's individual pixels. The number of plates is therefore chosen to increase the available surface area of each main (undivided) liquid stream by a factor of between 2 to 1024 using 1 to 10 plates, respectively. Such arrangements would produce 1 to 400 pixels per $mm^2$ for 1 to 10 plates respectively. This example assumes apertures 50 micrometers on center and requires state of the art machining techniques, such as lasers. Thus, for example, the available surface area of the main steams is increased between 32 to 64 times using 5 and 6 plates as described above, respectively. The cross-sectional area of the main (undivided) first and second liquid streams will be equivalent to the sum of cross-sectional areas of all of their respective pixels.

The pixelated liquid stream may be further processed so as to commingle the individual pixels somewhat. That is, the pixels may be caused to flow through commingling plates 30, 32 which define an array of apertures 30-1, 32-1, respectively, which are offset from one another and from the individual pixels. Thus, the pixels are caused to follow a serpentine-like tortuous path as they flow through the commingling plates 30, 32. The final plate 34 collects the somewhat commingled pixels within recessed basins 34-1 which communicate with the central discharge opening 34-2. This act of collecting the individual pixels into a single stream will further aid in their commingling. The liquid stream which is discharged from the opening 34-2 may be processed in a variety of ways. For example, the stream may be subjected to further mixing via conventional static mixers of the variety mentioned previously, and then directed to additional downstream processing. Thus, for example, if the pixelated liquid stream represents two different fiber-forming polymeric materials, it may be extruded through spinneret orifices so as to spin fibers therefrom. The spinning of the polymeric material will further cause the pixels to mix with one another. Use of such static mixers is not required, however, since the pixelated streams are intermingled sufficiently for some applications so as to cause substantially instantaneous mixing to ensue when adjacent ones of the individual pixels are allowed to contact one another.

Another embodiment of the present invention is depicted in accompanying FIGS. 4A–4E. In this regard, it will be understood that the plates 100 through 106 are in a stacked relationship with one another and are compressively sealed against one another in a manner similar to device 10 discussed above. The first plate in the stack, plate 100, serves as an inlet plate since it defines feed apertures 101-1, 101-2 into, and through, which the first and second liquids may be directed, respectively. The feed aperture 101-1 directs the first liquid into a recessed distribution channel 102-1 formed in plate 102, while the feed aperture 101-2 allows the second liquid to pass on sequentially through apertures 102-2, 104-2 in plates 102, 104 respectively, and be deposited into the distribution channel 106-2 of plate 106.

Figure 5:
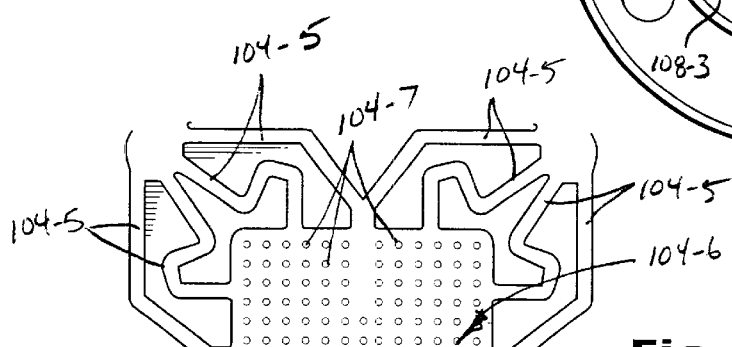
FIGS. 5 and 6 are enlarged plan views showing the aperture and flow channel arrays of the plates depicted in FIGS. 4D and 4E, respectively.

The distribution channel includes a pair of channels 102-3, each of which terminates in an arcuate feed channels 102-4. These channels 102-1, 102-3, 102-4 are in fluid-communication with channels 104-1, 104-3 and 104-4, respectively formed in plate 104. Each of the channels 104-1 fluid-communicates with manifold channels 104-5 so as to flood the recessed region 104-6 in which a square matrix array of apertures (a few of which are identified by reference numerals 104-7 in FIG. 5) is formed.

A matrix of through apertures 106-7 is formed in plate 106 and which is in registry with the matrix of apertures 104-7 formed in plate 104. Thus, each of the apertures 104-7 of plate 104 is in registry with a respective one of the apertures 106-7 of plate 106 to allow the pixels of first liquid formed thereby to flow therethrough.

Simultaneously, the second liquid is being directed from channel 106-2 to the arcuate feed channels 106-4 via channels 106-3 formed in plate 106. Each of these channels 106-2, 106-3 and 106-4 communicate with similarly configured channels 108-2, 108-3 and 108-4 formed in plate 108. As is perhaps more clearly shown in FIG. 6, each of the channels 108-4 fluid-communicates with manifold channels 108-5 so as to flood the recessed region 108-6 in which a square matrix array of apertures 108-8 is formed.

Figure 6:
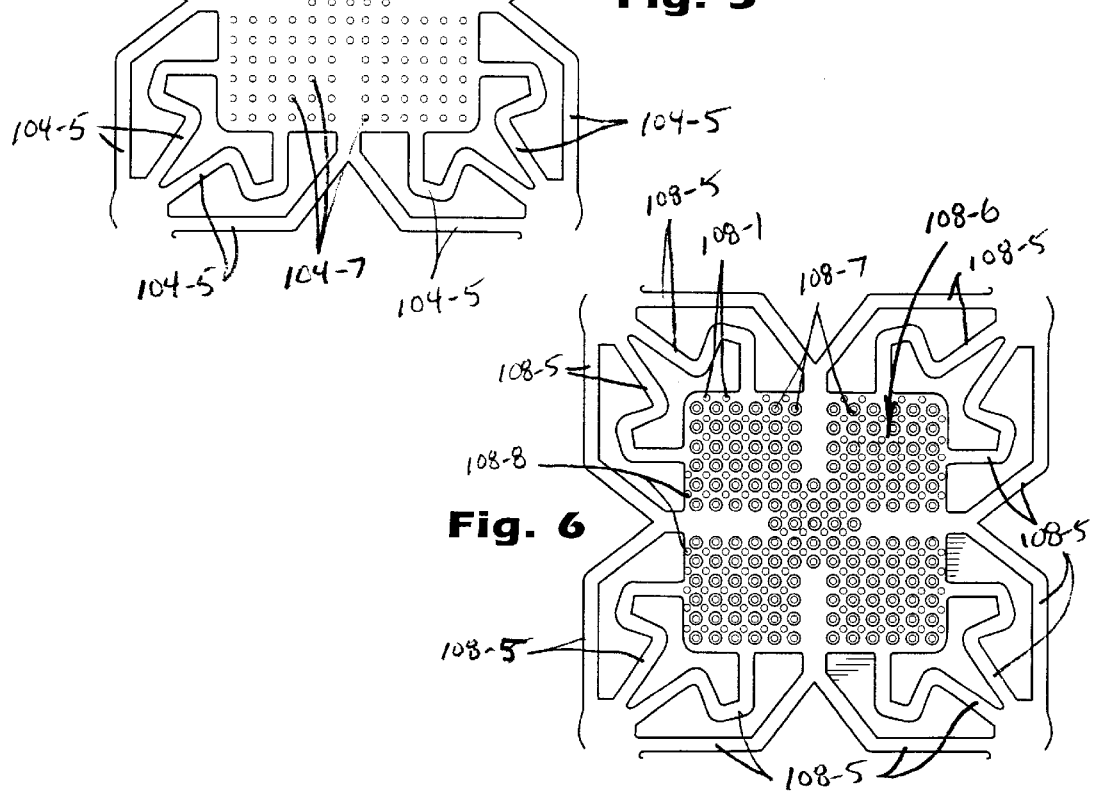

It will be observed in FIG. 6 that the plate 108 also is provided with a matrix of apertures 108-7. However, unlike the apertures 108-8, the apertures 108-7 are fluid-isolated from the recessed region 108-6 of plate 108 by respective cylindrical wall structures. These apertures 108-7 are, moreover, in registry with the apertures 106-7 formed in plate 106. As such, the first liquid pixels which flow through, and are defined by, the pixels 106-7 and 108-7 are fluid-isolated from the second liquid pixels which flow through, and are defined by, the apertures 108-8. Therefore, these pixels of first and second liquids which are defined by the apertures 108-7 and 108-8, respectively, will be disposed in respective square arrays with one array being misregistered with the other array. As such, an alternating pattern of pixels formed of the first and second liquids is achieved.

The pixelated liquid stream that exits from plate 108 may be subjected to collection and pixel-commingling as described above, and then directed to further processing as may be desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-pixel liquid stream comprising a first cross-sectional array of pixel domains of a first liquid component which are symmetrically misregistered with a second cross-sectional array of pixel domains of a second liquid component such that an individual pixel domain of said first cross-sectional array is centrally disposed relative to, and surrounded by individual pixel domains of said second cross-sectional array.

2. The liquid stream as in claim 1, wherein the first and second liquid components include first and second polymeric materials.

3. The liquid stream as in claim 2, wherein the first and second polymer materials have different coloration.

4. The liquid stream as in claim 3, wherein said first and second array of pixel domains are sufficiently dense such that the liquid stream exhibits a perceived color tone that is a combination of the coloration of said first and second polymeric materials.

5. The liquid stream as in claim 1, having between about 0.1 to about 4.0 pixels per $mm^2$.

6. The liquid stream as in claim 5, having between about 0.2 to about 2.5 pixels per $mm^2$.

7. The liquid stream as in claim 1, wherein the individual pixel domains are formed of different polymeric materials or the same polymeric material which differs in at least one of its physical, visual and constituent properties.

8. The liquid stream as in claim 1, wherein the individual pixel domains are formed of reactant streams.

9. A method of making a multi-pixel liquid stream comprising forming misregistered first and second cross-sectional geometric arrays of individual pixel domains from first and second liquid streams, respectively, such that an individual pixel domain of said first cross-sectional array is centrally disposed relative to, and surrounded by, individual pixel domains of said second cross-sectional array.

10. The method of claim 9, further comprising:
    introducing the second liquid stream into an interior location of the first array formed of said first liquid stream, and thereafter
    repeatedly splitting the second liquid stream laterally relative to the first array of individual pixel domains so as to form the second array of individual pixel domains which are separated from said first array of individual pixel domains.

11. The method of claim 10, wherein said step of introducing the second liquid stream into an interior location of the first array is practiced by directing the second liquid stream laterally relative to the first array of pixel domains.

12. A method of forming pixelated liquid streams comprising:
    (a) passing the first liquid stream through a series of plates having a symmetrical array of apertures to form a first liquid pixel array; while simultaneously
    (b) directing a second liquid stream through a geometric progression of X-shaped subdividing channels formed in the series of plates so as to form a second liquid pixel array which is misregistered with said first liquid pixel array.

13. A method as in claim 12, wherein said second liquid pixel array has $4^{(n-1)}$ number of individual pixels, and interfacial surface areas between the first and second liquid pixel arrays are increased by a factor of $2^n$, where n is the number of plates in said series of plates, and the sum total of cross-sectional flow area remains constant and the cross-sectional area of undivided host streams are equivalent to the summation of the cross-sectional area of the individual pixels.

14. A method of mixing first and second liquid streams comprising forming a pixelated liquid steam by passing the first liquid stream through a series of plates having a symmetrical array of apertures to form a first liquid pixel array; while simultaneously directing a second liquid stream through a geometric progression of X-shaped subdividing channels formed in the series of plates so as to form a second liquid pixel array which is misregistered with said first liquid pixel array, and thereafter bringing the individual pixels of said first and second liquid pixel arrays into mutual contact with one another.

15. A method as in claim 14, wherein said second liquid pixel array has $4^{(n-1)}$ number of individual pixels, wherein n is the number of plates in said series of plates.

16. Apparatus for forming pixelated liquid streams comprising:
(a) a series of plates having a symmetrical array of apertures to form a first liquid pixel array in response to a first liquid stream passing therethrough; and
(b) a geometric progression of X-shaped subdividing channels formed in the series of plates so as to form a second liquid pixel array which is misregistered with said first liquid pixel array in response to a second liquid stream passing therethrough.

17. Apparatus as in claim 16, wherein said X-shaped subdividing channels are such to form the second liquid pixel array having $4^{(n-1)}$ number of individual pixels, and to increase interfacial surface areas between the first and second liquid pixel arrays by a factor of $2^n$, where n is a number of plates in said series of plates, and the sum total of cross-sectional flow area remains constant and the cross-sectional area of undivided host streams are equivalent to the summation of the cross-sectional area of the individual pixels.

18. Apparatus for mixing first and second liquid streams comprising:
a series of plates having a symmetrical array of apertures to form a first liquid pixel array in response to a first liquid stream passing therethrough; and a geometric progression of X-shaped subdividing channels formed in the series of plates so as to form a second liquid pixel array which is misregistered with said first liquid pixel array in response to a second liquid stream passing therethrough; and a commingling plate which brings individual pixels of said first and second liquid pixel arrays into mutual contact with one another.

19. Apparatus as in claim 18, wherein said X-shaped subdividing channels form the second liquid pixel array having $4^{(n-1)}$ number of individual pixels, wherein n is the number of plates in said series of plates.

20. A multi-pixel liquid stream comprising:
a first cross-sectional array of pixel domains of a first liquid component formed by passing the first liquid component through a series of plates having a symmetrical array of apertures corresponding to said first cross-sectional array of pixel domains, and a second cross-sectional array of pixel domains of a second liquid component formed by passing the second liquid component through a geometric progression of X-shaped subdividing channels formed in the series of plates such that the second pixel array is misregistered with said first liquid pixel array, and such that an individual pixel domain of said first cross-sectional array is centrally disposed relative to, and surrounded by individual pixel domains of said second cross-sectional array.

21. The liquid stream as in claim 20, wherein the first and second liquid components include first and second polymeric materials.

22. The liquid stream as in claim 21, wherein the first and second polymer materials have different coloration.

23. The liquid stream as in claim 22, wherein said first and second array of pixel domains are sufficiently dense such that the liquid stream exhibits a perceived color tone that is a combination of the coloration of said first and second polymeric materials.

24. The liquid stream as in claim 20, having between about 0.1 to about 4.0 pixels per $mm^2$.

25. The liquid stream as in claim 20, having between about 0.2 to about 2.5 pixels per $mm^2$.

26. The liquid stream as in claim 20, wherein the individual pixel domains are formed of different polymeric materials or the same polymeric material which differs in at least one of its physical, visual and constituent properties.

27. The liquid stream as in claim 20, wherein the individual pixel domains are formed of reactant streams.

* * * * *